Dec. 24, 1957 W. E. BARCH 2,817,588
DECAFFEINATION OF COFFEE
Filed Jan. 7, 1954
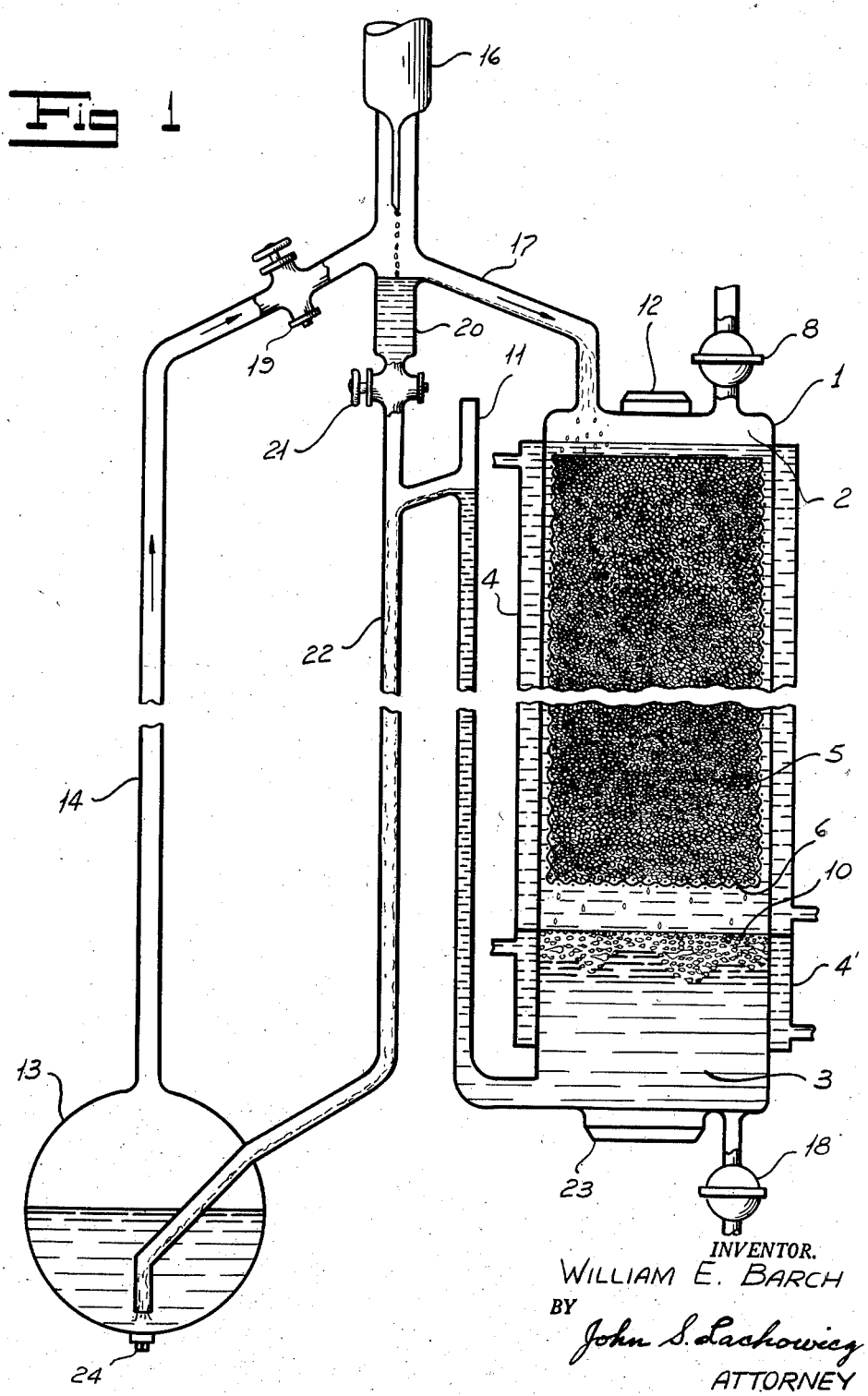
INVENTOR.
WILLIAM E. BARCH
BY
John S. Lachowiez
ATTORNEY United States Patent Office 2,817,588
Patented Dec. 24, 1957

2,817,588

DECAFFEINATION OF COFFEE

William E. Barch, New York, N. Y., assignor to Standard Brands Incorporated, New York, N. Y., a corporation of Delaware Application January 7, 1954, Serial No. 402,714

16 Claims. (Cl. 99—70)

This invention relates to a process for the decaffeination of coffee and particularly green coffee.

It has long been recognized that in order to completely remove caffein from green coffee beans it is necessary to saturate them with water. This causes the beans to expand and frees the caffein present in cells in the interior of the beans. Caffein has then been removed from the swollen beans by contacting them with an organic solvent for caffein.

The step of increasing the moisture content of the coffee beans has heretofore presented several difficulties. When steam is used the heat drives off coffee volatiles and destroys the flavor. Since water dissolves not only caffein but also flavor-imparting water-soluble constituents of the bean, excess water carries both of them off and so impairs the flavor. It is therefore necessary to avoid using water in excess of the amount needed to just saturate the beans. This requires careful measurement of the amount of water or steam added to the beans, a procedure which is difficult to control. Moreover, this amount of water is so small compared to the surface area of the coffee that it is difficult to obtain uniform and thorough moisture absorption. "Dry" spots which normally result may be avoided only by an extended absorption period, which deleteriously affects the coffee flavor.

When the swollen beans are extracted directly with an organic solvent, the solvent penetrates the beans and must be removed since even traces are sufficient to adversely affect coffee flavor. Generally the beans have been treated with steam to remove solvent but the last traces are not removed unless the steam treatment is considerably prolonged. Such prolonged treatment impairs the flavor of the beans.

The conventional decaffeination process, including the steps of saturating the beans with water, contacting them with an organic solvent until free of caffein, and then removing the absorbed solvent, usually requires from 40 to 48 hours. Both the moisture-absorption and caffein-extraction steps are very slow, the latter because of the slow rate of diffusion of caffein from the beans into the solvent.

Coffee beans have also been decaffeinated by direct contact with an emulsion of an organic solvent for caffein and water. This process, besides the problem of solvent removal, has the additional disadvantage that water circulates with the solvent and carries off a large proportion of the water-soluble coffee constituents.

It has been proposed to avoid the difficulties involved in direct constact of organic solvent with the beans by extracting the beans with an aqueous solution of water-soluble coffee constituents other than caffein and then extracting caffein from this solution at a point spaced from the beans by means of a water-immiscible organic solvent for caffein. However, this process likewise has several disadvantages.

The aqueous solution containing water-soluble coffee constituents is difficult to pump because of its high solids content. Moreover, the solution is unstable and ferments readily. It is also particularly subject to oxidation at the elevated temperatures necessary for efficient extraction. The extraction step presents a further problem since the solution has an extremely high tendency to form an emulsion with organic solvents. This emulsion is difficult to resolve into its components. After solvent extraction, the aqueous solution must be freed of entrained solvent before its return to the beans, or the beans will absorb solvent. This step is time-consuming, and requires use of either vacuum or steam, both of which adversely affect the coffee constituents dissolved in the solution.

Most of the difficulties involved in prior art processes can be avoided by the present invention according to which a water-immiscible solvent for caffein is passed through an aqueous liquor containing water-soluble coffee constituents and having immersed therein the coffee to be decaffeinated. The solvent removes caffein both from the coffee and from the liquor. Caffein is recovered from the solvent at a point spaced from the liquor and the solvent may then be recirculated.

Because the coffee water solubles other than caffein dissolved in the aqueous liquor are substantially in equilibrium concentration with the coffee water solubles in solution in the coffee beans the aqueous liquor extracts only the caffein from the beans. Dry green coffee beans may be used without preliminary steaming or soaking. By circulating the caffein solvent rather than the aqueous coffee liquor, changes which lead to deterioration of the dissolved coffee constituents, such as fermentation and oxidation, are avoided as well as the difficulties in pumping the aqueous liquor about a circulatory system. Only the minimum amount of aqueous liquor required to just cover the coffee to be decaffeinated need be used; this assists retention of coffee flavor. Moreover, the presence of an organic solvent for caffein appears to retard deterioration of the unstable substances dissolved in the aqueous liquor. Furthermore, the removal of caffein from the coffee proceeds more rapidly by this process than when the coffee beans are extracted with solvent in the absence of the aqueous liquor.

The invention also includes a method of preventing emulsification of the solvent and aqueous liquor by providing a layer of solvent adjacent the aqueous liquor. This effect is enhanced by maintaining a temperature differential between the two layers.

The invention also comprises a process for the removal of contaminating water-immiscible solvents from decaffeinated or other solvent-treated coffee. The coffee is immersed in an aqueous liquor containing water-soluble coffee constituents substantially in equilibrium concentration with those in solution in the coffee. Where caffein-free coffee is desired, the liquor will not contain caffein, but where caffein-containing coffee is being prepared, the liquor will contain caffein. If the coffee has been decaffeinated in accordance with the process of this invention, the process of solvent removal may be carried out using the aqueous liquor employed for the decaffeination, without removing the coffee therefrom.

The liquor containing the coffee is refluxed, the water-immiscible solvent distills as an azeotropic mixture with water and is continuously separated from the condensate and the water is returned to the liquor. During refluxing the solvent in the coffee is replaced by the aqueous liquor and solvent present in the aqueous liquor is removed by distillation as an azeotrope with water. Refluxing is discontinued when no further separation of solvent in the condensate is observed. Thus at the conclusion of the process no solvent remains either in the aqueous liquor or in the coffee. The solvent-free coffee may then be washed and dried.

It is also possible to adjust the caffein content of coffee to any desired value by immersing the coffee, whether decaffeinated or not, in an aqueous liquor containing caffein in the proportion required to adjust the caffein content of the coffee to the desired value. The coffee acquires or loses caffein through absorption of, or solution in, the aqueous liquor. If the coffee is contaminated with solvent, the liquor may be refluxed as previously described to remove solvent simultaneously.

The operation of the process and its advantages will be better understood from the following description of a practical embodiment of the invention but it is to be understood that this embodiment as specifically illustrated in the accompanying drawing is for purposes of example only and is not to be construed as a definition of the limits of the invention.

The single figure of the drawing illustrates diagrammatically a complete system adapted for the practice of the invention.

The extractor 1 is composed of an upper section 2 and a lower section 3. These sections are provided with jackets 4 and 4', respectively, through which a heating or cooling medium may be circulated. The green coffee beans 5 are supported in the section 2 within a perforated container 6, made, for example, of fine mesh stainless steel screen.

Water-immiscible caffein solvent is run into the extractor through the valve 8 to a level just below the perforated container 6, forming a layer disposed wholly within the section 3. Aqueous liquor saturated with respect to water-soluble coffee constituents is run in through the same valve, forming a second layer disposed upon and in contact with the solvent layer. The interface 10 between the aqueous liquor and the solvent is always maintained exactly at the boundary between the jackets 4 and 4', which point also marks the boundary between the upper and lower sections of the extractor. The top and interface liquid levels are maintained by the leveling device 11.

This extractor is designed for the use of caffein solvent having a density greater than the aqueous liquor, such as 1,2-dichloroethane. When solvents having a density less than the aqueous liquor are employed the position of extractor sections 2 and 3 and pipes 11 and 17 is reversed.

Green coffee beans to be decaffeinated are charged through the hatch 12 into the perforated container 6 which is suspended in section 2. The aqueous liquor is brought to the desired operating temperature by passing hot water through the jacket 4. Solvent in the evaporator 13 is boiled continuously and the solvent vapors pass upwardly through the pipe 14, and are condensed in the condenser 16. The condensed solvent collects in well 20 from which it overflows into the extractor through pipe 17. Globules of solvent pass downwardly through the aqueous liquor and through the interface 10 into the solvent layer at the bottom of the extractor while this solvent layer is kept at a low temperature by passing cold water through the jacket 4'. Solvent globules contact the coffee beans as they pass downwardly through the liquor and extract caffein both from the liquor and from the coffee beans.

Solvent charged with caffein is withdrawn from the extractor through the constant level device 11 into the evaporator 13 at the same rate at which it enters the extractor. Extraction is continued until the solvent layer is free of caffein, i. e., for about 9 hours.

When the beans have been fully decaffeinated, the solvent is withdrawn through valve 18. The perforated container 6 is then lowered to the bottom of the extractor 1, valve 19 is closed, and the liquor is brought to a boil by passing a heating medium through jackets 4 and 4'. Mixed vapors of water and solvent pass upwardly through the pipe 17 and are condensed in the condenser 16. The condensate collects in well 20, where it separates into two layers. Solvent is withdrawn from the lower layer from time to time through valve 21 and pipe 22 into evaporator 13, while water from the upper layer overflows continuously into extractor 1 through pipe 17. Solvents lighter than water may be removed by this separator by reversing the position of pipes 17 and 22.

Refluxing is continued until no more solvent is observed in the well 20. Solvent absorbed in the decaffeinated beans has then been fully replaced by the aqueous liquor and solvent present in solution or dispersed in the liquor has been substantially completely removed. This usually requires about 1½ hours.

The aqueous liquor is withdrawn through valve 18, water is admitted through valve 8 to wash the beans and the wash water is withdrawn through the valve 18 for addition to the aqueous liquor to bring it to its original volume. The beans are then removed through hatch 23 and dried, preferably in a vacuum at a low temperature, to their original moisture content.

A typical run was carried out in the apparatus shown in the drawing as follows.

150 liters of 1,2-dichloroethane were placed in the extractor and the same amount in evaporator 13. 200 liters of an aqueous liquor containing water-soluble coffee constituents were run into the extractor. 100 kilograms of green coffee beans were then charged into the container 6. With the aqueous liquor at 71° C. and the solvent layer at about 20° C. and with the solvent in the evaporator boiling continuously at such a rate as to pass 700 liters of solvent per hour through the aqueous liquor, it was found that the coffee could be completely decaffeinated in about 9 hours. On evaporation of the caffein-laden solvent it was found to contain 910 grams of crude caffein, 620 grams of phenols and 30 grams of other water-soluble compounds.

The term "coffee" as used in the specification and claims includes both green and roasted coffee in the whole bean state as well as in a ground, chopped, crushed or otherwise comminuted form. Whole green coffee beans are preferred but comminuted green beans may be used with good results. However, a higher percentage of non-caffein constituents are extracted from the latter. Depulped undried coffee beans still retaining their parchment covering may also be employed, caffein being extracted therefrom at substantially the same rate as from beans without the parchment covering.

The aqueous liquor used in the invention may be prepared initially in any suitable way, as by adding coffee water-solubles to water in an amount sufficient to provide the proper concentration in the liquor. Also, green coffee may be immersed in water and the mixture heated at approximately the temperature at which the decaffeination is to be carried out until the water will not dissolve any more coffee constituents. Preferably however, the proper concentration of water-solubles is built up automatically in the solution from the beans initially treated. Thus water initially carrying no coffee solubles in solution will take up more and more solubles from the beans until the concentration of the solubles other than caffein reaches the equilibrium point, the caffein meanwhile being continuously extracted from the liquor and the beans by the organic solvent.

The aqueous liquor is easily oxidized and unstable. It is also very susceptible to molds. It becomes sour within 48 hours at room temperature due to mold growth. At higher temperatures oxidation is accelerated so that prevention of mold growth by heating is impractical. However, when the liquor contains or is in contact with a chlorinated organic solvent for caffein its deterioration due to mold growth is arrested. For instance, the liquor may be preserved for at least three months at room temperature without substantial change when it is in contact with 5% of ethylene dichloride. Because of the perishable nature of the liquor as little as possible is used, preferably that volume which will barely cover the coffee, that is approximately 2 liters for each kilogram of coffee.

Each batch of green coffee beans absorbs water from the liquor during the decaffeination process. This loss may be made up before reuse by the addition of an amount of pure water equal to the amount absorbed. Although the liquor is thus diluted, it comes into equilibrium with the next batch of coffee immersed in it during the process, and, since that coffee absorbs substantially the same amount of liquor as did the previous batch, there is no net loss of coffee water-solubles to the liquor.

For convenience the specification refers to the aqueous liquor as having an equilibrium concentration of coffee water solubles other than caffein. It will be understood that this is true only with respect to those coffee water solubles which are insoluble in the organic solvent employed during the extraction process. The amount of water-soluble coffee constituents other than caffein dissolved by the solvent will vary considerably with different solvents but will be very small in any case.

The aqueous liquor also becomes saturated with respect to the organic solvent employed. The amount of solvent dissolved will, of course, depend upon its solubility in water and is in general of the order of 8% or less for most so-called "water-immiscible" solvents. This small amount of solvent present in solution plays a part in accelerating the removal of caffein from the inner cells of the coffee.

The solvent should have a high dissolving power for caffein, a low dissolving power for flavor-imparting coffee constituents, and should give an azeotropic boiling mixture with water. It should be a water-immiscible liquid at the temperatures used for the extraction and have a boiling point sufficiently low to permit recovery of caffein therefrom at atmospheric or reduced pressures without caffein decomposition. Polychlorinated hydrocarbon solvents best meet these requirements and are therefore preferred, but other known solvents of caffein may be used. Satisfactory solvents are, for instance, 1,1- and 1,2-dichloroethane, benzene, toluene, methylene dichloride, chloroform, carbon tetrachloride, dichlorobenzene, trichloroethylene, trichloropropane, dichloropropane, monochlorodiethyl ether and diisopropyl ether.

By a proper choice of solvent it is possible to produce decaffeinated coffee of better flavor than the original caffein-containing coffee. Cheaper grades of coffee usually have a bitter taste due probably to the presence of phenols. By employing a solvent for caffein such as 1,2-dichloroethane, which has a pronounced solvent power for these bitter tasting materials, they may be removed from the coffee together with the caffein.

The process may be conducted as a continuous countercurrent flow extraction or as a continuous counter-current battery extraction. In the first method coffee to be decaffeinated is flowed through an aqueous liquor held stationary in an extractor countercurrently to the flow of solvent through the liquor, for instance, in the type of apparatus shown in U. S. Patent 2,284,033. The length of travel in the apparatus, the rate of flow of coffee and solvent and the temperature of the aqueous liquor are so chosen that the coffee is substantially caffein-free at the time it leaves the aqueous liquor. The solvent and/or the coffee may be circulated through a series of such extractors, if desired.

In the second method, individual batches of coffee are held stationary in aqueous liquor in a series of extractors. Solvent for caffein is passed through each of these extractors in turn, caffein being removed from the solvent thereafter at a point spaced from the extractors. The position of the individual extractors relative to the flow of solvent is progressively advanced in the opposite direction to that of the solvent flow as coffee contained in the extractors is decaffeinated and replaced by fresh coffee.

The aqueous liquor is held preferably at an elevated temperature to obtain caffein extraction at a high rate. The maximum temperature should be below the boiling point of the solvent or the boiling point of its azeotrope with water, whichever is lower. Temperatures between 25° and 100° C. may usually be employed, although temperatures below 80° C. are preferred to avoid chemical change of flavor-imparting coffee constituents.

The rate of flow of solvent through the liquor is governed by the quantity of coffee and by the rate of diffusion of caffein from the interior of the coffee into the liquor and/or the solvent which in turn depends upon the temperature used.

An aqueous liquor containing water-soluble coffee constiutents shows a strong tendency to emulsify with solvents for caffein, apparently due in part at least to the high percentage of saponins contained therein. Emulsification may be held to a minimum by minimizing the movement of the solvent and aqueous liquor against each other. It has been found that in general emulsification is largely prevented and sufficient agitation of the aqueous liquor is provided by simply flowing the solvent slowly through the liquor in the form of globules, without stirring or other supplemental agitation, while the aqueous liquor is held stationary. Emulsification may occur even under such conditions if the globules of solvent acquire or entrain an atmosphere of liquor during their passage through the same. Unless this atmosphere is removed as the solvent globule leaves the liquor or shortly thereafter, the liquor will be carried away entirely in the normal course of the decaffeination process.

It has been found that loss of aqueous liquor during passage of solvent therethrough may be entirely prevented by disposing a layer of the solvent adjacent to and in contact with that surface of the aqueous layer through which the solvent globules emerge.

This procedure appears to bring several physical forces into play, the combination of which results in stripping each solvent globule of entrained aqueous liquor at or in the vicinity of the interface between the two layers.

It is also desirable to maintain the adjacent layers of solvent and liquor at different temperatures. As each solvent globule with its atmosphere of liquor passes into the solvent layer from the aqueous liquor the temperature differential brings about changes in the volume of both the globule and the atmosphere of liquor it carries. Usually the solvent layer is held at a lower temperature than the liquor; in this event both the globule and the atmosphere it carries contract. Since the two have different expansion and contraction coefficients the continuity of the atmosphere on the surface of the globule is broken. This rupture assists stripping the atmosphere from the globule.

Since the caffein extraction process is carried out at elevated temperatures, it is generally more convenient to hold the liquor layer at a higher temperature than the solvent layer. When the aqueous liquor is held at a temperature between 60 and 80° C. the solvent may be held at 20 to 30° C. (room temperature). A temperature differential of about 25 to 60° C. is preferred, although with most solvent systems a temperature differential of about 10 to 15° C. has been found to be sufficient.

The solvent layer contains a relatively large mass of unemulsified solvent compared to the globule and thus tends to buoy up (or down depending upon its density) the atmosphere of aqueous liquor. This buoyant action likewise tends to strip the atmosphere from the globule. Whatever the reason for this effect, the atmosphere gradually strips away from the surface of the globule as the globule is forced deeper and deeper into the mass of solvent by globules which follow it. Eventually the liquor atmosphere is removed completely and the globule blends indistinguishably into the solvent layer.

This method of preventing emulsion formation may also be applied to a caffein extraction process in which an aqueous liquor comprising caffein is passed through a solvent for caffein.

I claim:

1. Method of extracting caffein from coffee which comprises immersing coffee in an aqueous liquor containing coffee water solubles and passing a liquid water-immiscible caffein solvent through the liquor until the desired reduction in the caffein content of the coffee is obtained, the coffee being completely immersed in the liquor throughout the extraction process and the coffee water solubles in the liquor not dissolved by the solvent being substantially in equilibrium concentration with the coffee water solubles in solution in the coffee.

2. A method in accordance with claim 1 which includes separating the caffein-laden solvent, recovering caffein from said solvent and then recirculating recovered caffein-free solvent through the liquor.

3. A process in accordance with claim 2 in which the solvent is passed through a series of batches of aqueous liquor and coffee to be decaffeinated prior to recovery of caffein therefrom.

4. A process in accordance with claim 1 in which the coffee is continuously flowed through the liquor countercurrently with respect to the flow of the solvent through the liquor.

5. A process in accordance with claim 1 in which the aqueous liquor is maintained at a temperature between about 25° and 100° C.

6. A process in accordance with claim 1 in which the solvent for caffein is dichloroethane.

7. A method of extracting caffein from coffee which comprises maintaining in an extraction zone a layer of aqueous liquor containing coffee water solubles and having coffee immersed therein, passing a water-immiscible solvent for caffein through said liquor, the coffee water solubles in the liquor not dissolved by the solvent being substantially in equilibrium concentration with the coffee water solubles in solution in the coffee, and maintaining a layer of the solvent for caffein in contact with the layer of aqueous liquor at the surface thereof through which the solvent emerges.

8. A method in accordance with claim 7 wherein the layers of solvent and aqueous liquor are maintained at different temperatures.

9. A method of removing solvent from coffee which has become contaminated with a water-immiscible solvent for caffein which comprises immersing the coffee in an aqueous liquor containing coffee water solubles substantially in equilibrium concentration with the coffee water solubles in solution in the coffee, refluxing the liquor while the coffee is immersed therein, condensing the vapors, continuously separating the solvent from the condensate and returning only water to the liquor.

10. A method of removing solvent from decaffeinated coffee contaminated with a water-immiscible solvent for caffein which comprises immersing the coffee in an aqueous liquor containing coffee water solubles other than caffein which are substantially in equilibrium concentration with the coffee water solubles in solution in the coffee, refluxing the liquor while the coffee is immersed therein, condensing the vapors, continuously separating the solvent from the condensate and returning only water to the liquor.

11. A method in accordance with claim 1 in which the solvent for caffein is methylene chloride.

12. In a process of removing caffein from coffee involving the swelling of the coffee with water and extraction of the caffein therefrom the steps of immersing dry coffee in an aqueous liquor containing coffee water solubles and passing a liquid water-immiscible caffein solvent through the liquor until the desired reduction in the caffein content of the coffee is obtained, the quantity of liquor being sufficient to maintain the coffee completely immersed therein during the entire process and the coffee water solubles in the liquor not dissolved by the solvent being substantially in equilibrium concentration with the coffee water solubles in solution in the coffee.

13. A method as claimed in claim 1 wherein the coffee is green coffee.

14. A method as claimed in claim 7 wherein the coffee is green coffee.

15. The method of extracting caffein from coffee which comprises completely immersing coffee in a stationary aqueous solution of coffee water solubles, extracting caffein by passing a water-immiscible organic caffein solvent through the said solution while maintaining the coffee immersed therein, the coffee solubles in said solution not dissolved by the solvent being substantially in equilibrium concentration with the coffee solubles in solution in the coffee, permitting the caffein bearing organic solvent to separate in a layer, withdrawing solvent from this layer, distilling the withdrawn organic solvent, passing the distilled solvent through said aqueous solution, withdrawing the decaffeinated coffee, washing the withdrawn coffee in an amount of water substantially equal to the amount of said solution absorbed by the coffee and adding said wash water to said solution to maintain a substantially constant volume thereof.

16. A method as claimed in claim 15 wherein the coffee is green coffee.

References Cited in the file of this patent

UNITED STATES PATENTS

| | | |
|---|---|---|
| 1,957,358 | Scheele | May 1, 1934 |
| 2,284,033 | Berry | May 26, 1942 |
| 2,309,092 | Berry et al. | Jan. 26, 1943 |

FOREIGN PATENTS

| | | |
|---|---|---|
| 635,185 | Great Britain | Apr. 5, 1950 |
| 492,560 | Canada | May 5, 1953 |